United States Patent [19]

Akasu

[11] Patent Number: 5,179,286
[45] Date of Patent: Jan. 12, 1993

[54] DISTANCE MEASURING APPARATUS RECEIVING ECHO LIGHT PULSES

[75] Inventor: Masahira Akasu, Himeji, Japan

[73] Assignee: Mitsubishi Denki K.K., Tokyo, Japan

[21] Appl. No.: 770,263

[22] Filed: Oct. 3, 1991

[30] Foreign Application Priority Data

| Oct. 5, 1990 | [JP] | Japan | 2-268789 |
| Oct. 5, 1990 | [JP] | Japan | 2-268790 |
| Oct. 29, 1990 | [JP] | Japan | 2-292762 |
| Nov. 2, 1990 | [JP] | Japan | 2-298672 |

[51] Int. Cl.$^5$ ............................ G01N 21/86; G01C 3/08
[52] U.S. Cl. .................................. 280/561; 356/5
[58] Field of Search ............... 250/561, 201.4; 356/5, 356/4; 254/403

[56] References Cited

U.S. PATENT DOCUMENTS

| 4,259,592 | 3/1981 | Frügel et al. | 356/5 |
| 4,344,705 | 6/1982 | Kompa et al. | 356/5 |
| 4,699,507 | 10/1987 | Etoh | 356/5 |
| 4,849,644 | 7/1989 | Mira et al. | 250/561 |
| 4,916,302 | 4/1990 | Sorimachi et al. | 250/561 |
| 5,102,219 | 4/1992 | Skagerlund | 356/5 |
| 5,102,220 | 4/1992 | Tsedeke | 356/5 |

Primary Examiner—David C. Nelms
Assistant Examiner—Michael Messinger
Attorney, Agent, or Firm—Sughrue, Mion, Zinn, Macpeak & Seas

[57] ABSTRACT

A distance measuring apparatus for measuring a distance to an object of concern includes a clock pulse generator for generating a clock pulse signal at a predetermined frequency, a pulsed laser for emitting a light pulse to the object, a photodetection circuit for detecting an echo light pulse resulting from reflection of the light pulse at the object, an analogue-to-digital converter for converting an electric signal output from the photo-detection circuit to digital data under the timing of the clock pulse signal, and a memory for sequentially storing the digital data output from the analogue-to-digital converter on a time-serial basis, and a processing unit for processing the data stored in the memory to thereby arithmetically determine the distance to the object on the basis of a peak appearing in an echo waveform reconstituted from the data, a time lapse from the emission of the light pulse to the appearance of the peak, and the frequency of the clock signal. High accuracy distance measurement can be realized with improved linearity and SN ratio. By synthesizing an echo waveform from the data obtained through a plurality of light pulse emissions, resolution of the distance measurement can be enhanced.

14 Claims, 10 Drawing Sheets

DISTANCE MEASURING APPARATUS RECEIVING ECHO LIGHT PULSES

BACKGROUND OF THE INVENTION

The present invention relates to a range-finding or distance measuring apparatus for measuring a distance to an object of concern by emitting a light pulse to the object, receiving an echo light pulse reflected back from the object, and determining the distance to the object on the basis of a time elapsed from the emission of the light pulse to the reception thereof.

As the range-finding system or distance measuring apparatus of the type mentioned above, there is known an apparatus in which a laser pulse beam of high intensity is employed, as disclosed, for example, in Japanese Patent Publication No. 1632/1971. FIG. 9 shows the structure of this known distance measuring apparatus. Referring to the figure, a counter 9 starts to count clock pulses generated by a clock pulse generator 2 simultaneously with the emission of a light pulse from a pulsed laser 1. A photo-detection circuit 3 receives an echo light pulse reflected back from an object of concern or target 10 illuminated with the emitted light pulse and outputs an electric pulse signal after amplification. A pulse discriminator 8 compares the electric pulse signal output from the photo-detection circuit 3 with a predetermined threshold level to thereby separate discriminatively from spurious signal components the electric pulse component which corresponds to the echo light pulse. In response to the pulse output from the pulse discriminator 8, the count value of the counter 9 is read out and processed by a processing unit 7A to determine a distance between the range-finding apparatus and the object in accordance with the following equation (1):

$$\text{Distance} = (\text{Count Value} \times \text{Clock Pulse Period} \times \text{Velocity of Light})/2 \quad (1)$$

In other words, the distance is determined by dividing by two a product resulting from multiplication of a time intervening between the emission of the light pulse and the reception of the echo pulse signal with the velocity of light, wherein the time mentioned above is determined on the basis of the count value of the counter 9.

As can be understood from the equation (1), resolution of the distance measurement by the known distance measuring apparatus of the type described above depends on the period or frequency of the clock pulse. By way of example, when the frequency of the clock pulse signal generated by the clock pulse generator 2 is selected to be 30 MHz which represents approximately an upper limit of the frequency to which a typical general-purpose digital IC can respond, resolution of the distance measurement is on the order of 5 m. In order to improve the resolution of the distance measurement, it is necessary to increase the frequency of the clock pulse signal. For example, if the resolution on the order of 50 cm is to be realized, frequency of the clock pulse signal generated by the clock generator 2 will have to be 300 MHz. In that case, the components constituting the distance measuring apparatus such as the counter 9, the clock pulse generator 2 and others have to be implemented by using those elements which are capable of responding at ultra-high speed or pulse repetition rate. To say in another way, the conventional general-purpose digital IC can no more be used to this end, but specific and very expensive components must be resorted to, which in turn means that the distance measuring apparatus becomes very expensive. An attempt for further enhancing the resolution must be started from development of such elements or constituents themselves which are capable of operating at a ultra-high speed.

In conjunction with the known distance measuring apparatus such as described above, it is further noted that the echo light pulse reflected back from the object 10 can be detected to thereby generate a pulse for stopping the pulse counting of the counter 9 without fail by making use of a high threshold level in the pulse discriminator 8 only on the conditions that the target object 10 is located relatively in the close vicinity of the distance measuring apparatus, that the intensity of the echo light pulse is sufficiently high and that a satisfactorily good S/N ratio can be ensured for the photo-detection circuit 3. However, when the object of concern is at a relatively remote position or when the reflection coefficient of the object is so low as to make feeble the intensity of the echo light pulse, the threshold level of the pulse discriminator 8 can not be set high. In that case, it may eventually occur that the distance will erroneously be determined due to noise components contained in the output signal of the photo-detection circuit 3 before the echo light pulse arrives at the distance measuring apparatus. Thus, in order to prevent erroneous determination due to noise, the threshold level of the pulse discriminator 8 has to be set high. In that case, however, there arises a possibility that the intrinsic echo light pulse can not be detected either for the reasons mentioned above. Such being the circumstances, limitation is undesirably imposed on the range of distance which can be measured with the known distance measuring apparatus, giving rise to a serious problem.

In conjunction with the known distance measuring apparatus, it is further noted that comparison of the output signal of the photo-detection circuit 3 with the threshold level is inevitably accompanied with a problem that the timing for generation of the pulse to stop counting changes as the threshold level varies, ultimately involving error in the distance measurement.

The above problem will be elucidated in more concrete by reference to FIG. 10. In general, the light pulse emitted by the pulsed laser 1 can not assume a rectangular waveform but a rather rounded waveform which can be approximated by a Gaussian curve or a raised cosine curve under the influence of characteristics of a laser drive circuit, relaxation time and other factors. Refer to FIG. 10 at (a). Consequently, the signal output from the photo-detection circuit 3 in response to the echo light pulse reflected back from the object assumes a waveform which is temporally broadened relative to the laser pulse waveform because of inevitable band limitation encountered in the photo-detection circuit 3, as will be seen in FIG. 10 at (b). Such temporally extended waveform is compared with a preset threshold level V by the pulse discriminator 8. In that case, the timing at which the output pulse is generated by the pulse discriminator 8 becomes different in dependence on the amplitude of the signal output by the photo-detection circuit 3. By way of example, referring to FIG. 10 at (c), there are illustrated a pulse waveform having a high amplitude by a solid line together with a pulse waveform of a low amplitude by a broken line. As will be understood from comparison of these waveforms, when the amplitude is low, the timing at which the output pulse is generated by the pulse discriminator 8 is accompanied with a time lag or delay when compared with that of the high amplitude, which in turn means that the distance will be measured longer than the actual distance. Accordingly, it is apparent that an error is also involved in the measured distance in dependence on the different reflection coefficients of the objects.

It is further observed that the intensity of light undergoes attenuation as a function of the second power of the distance. Consequently, magnitude of the error involved in the distance measurement becomes different in dependence on differences in the distance to the objects to be detected, whereby linearity of the distance measurement is unwantedly impaired.

SUMMARY OF THE INVENTION

It is therefore an object of the present invention to provide a distance measuring apparatus (also known as range-finding apparatus) which is substantially immune to the problems and shortcomings of the known apparatus described above.

Another object of the present invention is to provide a distance measuring apparatus which can ensure a drastically improved resolution of distance detection even in a clock frequency range to which conventional digital IC can respond without resorting to use of especial and expensive components.

It is a further object of the present invention to provide a distance measuring apparatus which is capable of identifying discriminatively an intrinsic echo light pulse reflected back from an object of concern even in the case where the SN ratio of a detection signal of the echo light pulse is poor.

It is yet another object of the present invention to provide a distance measuring apparatus which can evade error due to variations in the reflection coefficient and the distance and which can thus enjoy an improved linearity of distance measurement.

In view of the above and other objects which will become apparent as description proceeds, there is provided according to a first aspect of the invention a distance measuring apparatus for measuring a distance to an object of concern, which apparatus comprises a clock pulse generator for generating a clock pulse signal at a predetermined frequency, a clock pulse delay circuit for delaying a period of the clock pulse signal by an amount corresponding to an integral multiple of a time duration resulting from division of the clock pulse period with an integer (N) which is greater than 2 (two) to thereby generate a delayed clock pulse signal, a light pulse generator for generating a light pulse at a timing synchronous with a given one of the pulses of the delayed clock pulse signal, a photo-detection circuit for receiving an echo light pulse resulting from reflection of the light pulse at the object and converting the echo light pulse into an electric signal, an analogue-to-digital converter for converting the electric signal output from the photo-detection circuit to a digital signal at a timing which is in synchronism with the clock pulse signal, a memory for sequentially storing the digital data obtained from the analogue-to-digital conversion, and a processing unit for imparting different delays to the clock pulse signal for every N light pulse generation, respectively, and synthesizing N echo light pulse sample data stored in the memory by rearranging time-serially the echo light pulse sample data, to thereby arithmetically determine the distance to the object on the basis of a pulse waveform obtained by the synthesization.

With the structure of the distance measuring or range-finding apparatus described above, a clock pulse signal having a predetermined frequency and generated by the clock pulse generator is delayed by the clock pulse delay circuit by an amount set by the processing unit, whereby a delayed clock pulse signal is generated. Further, the processing unit determines memory areas for storing the echo pulse signal data and commands the light pulse emission to the light pulse generator. In response to the command, the light pulse generator emits a light pulse in synchronism with a first appearance of the delayed clock pulse. The echo light pulse reflected back from an object of concern is received by the photo-detection circuit and undergoes photoelectric conversion. An electric signal output from the photo-detection circuit is amplified and input to the analogue-to-digital converter, whereby the input electric signal is sampled under the timing synchronous with the clock pulse signal. Digital data thus obtained is stored in the memory area designated by the processing unit in synchronism with the clock pulse signal. For a time duration corresponding to a range of distance for measurement, the A/D conversion and the storage of the digital data in the memory area are performed repeatedly. The A/D conversion is stopped after the lapse of the above-mentioned time duration. Then, the processing unit designates a new memory area of the memory which is different from the preceding area and at the same time changes the amount of delay to be applied to the clock pulse signal. Thereafter, the routine covering from the light pulse emission to the storage of the digital data in the memory described above are again performed. This process is repeated a number of times. In this conjunction, the amount by which the clock pulse signal is delayed is determined as a quotient resulting from division of the period of the clock pulse signal with the number of times the above-mentioned process is to be repeated. Finally, the processing unit reads out from the memory areas the data resulting from the A/D conversions, respectively, and sequentially rearranges the data on a time serial basis, beginning with the data obtained first, whereon the processing unit arithmetically determines the distance to the object on the basis of a waveform reconstituted from the data rearranged.

According to a second aspect of the present invention, there is provided a distance measuring or range-finding apparatus for measuring a distance to an object of concern, which apparatus comprises a clock pulse generator for generating a clock pulse signal at a predetermined frequency, a clock pulse delay circuit for delaying the clock pulse signal by an amount corresponding to an integral multiple of a time duration resulting from division of the period of the clock pulse with an integer (N) which is greater than 2 (two) to thereby generate a delayed clock pulse signal, a light pulse generator for generating a light pulse at a timing synchronous with a given one of the pulses of the clock pulse signal, a photo-detection circuit for receiving an echo light pulse resulting from reflection of the light pulse at the object and converting the echo light pulse into an electric signal, an analogue-to-digital converter for converting the electric signal output from the photo-detection circuit to a digital signal in synchronism with the individual clock pulses of the delayed clock pulse signal, a memory for sequentially storing the digital data obtained from the analogue-to-digital conversion, and a processing unit for imparting different delays to the clock pulse signals generated for every N light pulse generation, respectively, and synthesizing N echo light pulse sample data stored in the memory by rearranging time-serially the echo light pulse sample data, to thereby arithmetically determine the distance to the object on the basis of a pulse waveform obtained by the synthesization.

With the structure of the distance measuring or range-finding apparatus described above, a clock pulse signal having a predetermined frequency and generated by the clock pulse generator is delayed by the clock pulse delay circuit by an amount set by the processing unit, whereby a delayed clock pulse signal is generated. Further, the processing unit determines a memory area for storing the echo pulse signal data and commands the light pulse emission to the light pulse generator. In response to the command, the light pulse generator emits a light pulse in synchronism with a first appearance of the clock pulse. The echo light pulse reflected back from an object of concern is received by the photo-detection circuit and undergoes photoelectric conversion. An electric signal output from the photo-detection circuit is amplified and input to the analogue-to-digital converter, whereby the input electric signal is sampled in synchronism with the clock pulse signal. Digital data thus obtained is stored in the memory area designated by the processing unit in synchronism with the delayed clock pulse signal. For a time duration corresponding to a range of distance for measurement, the A/D conversion and the storage of the digital data in the memory area are executed repeatedly. The A/D conversion is stopped after the lapse of the above-mentioned time duration. Then, the processing unit designates a new memory area of the memory different from the preceding area and at the same time changes the amount of delay to be applied to the clock pulse signal. Thereafter, the routine including the light pulse emission to the storage of the digital data in the memory described above are again performed. This process is repeated a number of times. In this conjunction, the amount by which the clock pulse signal is delayed is determined as a quotient resulting from division of the period of the clock pulse signal with the number of times the above-mentioned process is to be repeated. Finally, the processing unit reads out from the memory area the data resulting from the A/D conversions, respectively, and sequentially rearranges the data on a time serial basis, beginning with the data obtained first, whereon the processing unit arithmetically determines the distance to the object on the basis of a waveform reconstituted from the data rearranged.

Further, according to a third aspect of the present invention, there is provided a distance measuring apparatus for measuring a distance to an object of concern, which apparatus comprises a clock pulse generator for generating a clock pulse signal at a predetermined frequencey, a pulse generator for generating a light pulse or an electromagnetic wave pulse, a detection circuit for detecting an echo pulse resulting from reflection of the light pulse or the electromagnetic wave pulse at the object, an analogue-to-digital converter for converting the echo signal output from the detection circuit to a digital signal in synchronism with the clock pulse signal, a memory for sequentially storing the digital data output from the analogue-to-digital converter, and a processing unit for processing the data stored in the memory to thereby arithmetically determine the distance to the object.

With the structure of the distance measuring apparatus, the pulse emitted from the pulse generator is reflected back from an object of interest and detected as an echo pulse, which then undergoes photoelectric conversion and the A/D conversion in synchronism with the clock pulse signal. For a time duration corresponding to a range of distance for measurement, the A/D conversion and storage of the result thereof in the memory is repetitively performed. Upon lapse of the above-mentioned time duration, the A/D conversion is stopped, whereon the results of the A/D conversion stored in the memory are read out by the processing unit which then arithmetically determines the distance to the object on the basis of the results of the A/D conversion read out from the memory.

Furthermore, according to a fourth aspect of the present invention, there is provided a distance measuring apparatus for measuring a distance to an object of concern, which apparatus comprises a clock pulse generator for generating a clock pulse signal at a predetermined frequency, a pulse generator for generating a light pulse or an electromagnetic wave pulse, a detection circuit for detecting an echo pulse resulting from reflection of the light pulse or the electromagnetic wave pulse at the object, an analogue-to-digital converter for converting the echo signal output from the detection circuit to a digital signal in synchronism with the clock pulse signal, a memory for storing sequentially the digital data output from the analogue-to-digital converter, and a processing unit for averaging the data obtained from the analogue-to-digital conversion and stored in the memory for a predetermined number of the pulse generations and arithmetically determining a distance to the object on the basis of data obtained from the averaging operation.

With the structure of the distance measuring apparatus, the pulse emitted from the pulse generator is reflected back from an object of interest and detected as an echo pulse, which then undergoes photoelectric conversion and the A/D conversion in synchronism with the clock pulse signal. For a time duration corresponding to a range of distance for measurement, the A/D conversion and storage fo the result thereof in the memory is repetitively performed. Upon lapse of the above-mentioned time duration, the A/D conversion is stopped. The processing unit then reads out the results of the A/D conversions performed for a plurality of the pulse generations from the memory and averages the results. On the basis of the data obtained from the averaging operation, the processing unit arithmetically determines the distance to the object.

The above and other objects, features and advantages of the present invention will be better understood from the following description of preferred embodiments thereof taken in conjunction with the accompanying drawings.

DESCRIPTION OF THE PREFERRED EMBODIMENTS

Now, the present invention will be described in detail in conjunction with preferred or exemplary embodiments thereof by reference to the drawings.

Figure 1:
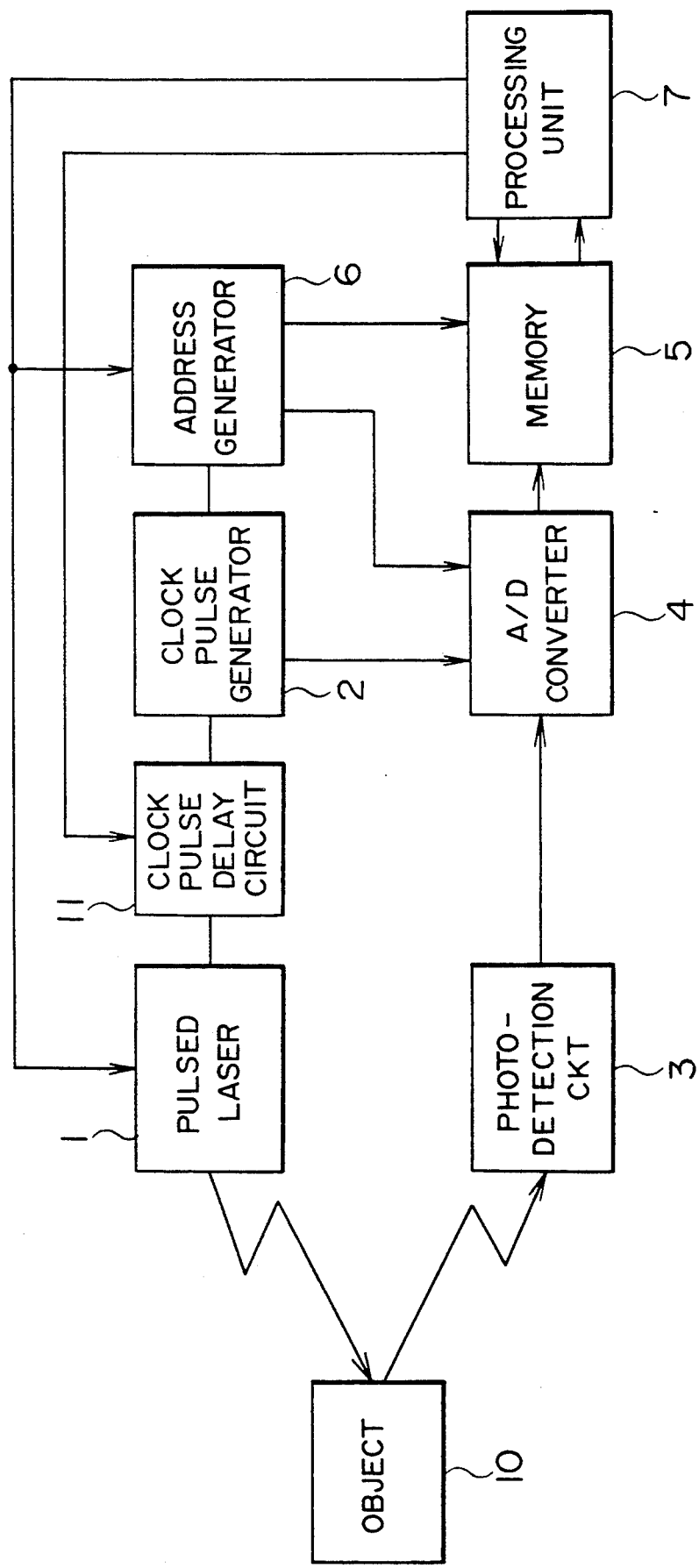
FIG. 1 is a block diagram showing the general arrangement of a distance measuring apparatus according to a first embodiment of the present invention.

FIG. 1 is a block diagram generally showing the arrangement of a distance measuring (range-finding) apparatus according to a first embodiment of the invention. In the figure, a reference numeral 1 denotes a pulsed laser for emitting a light pulse at a timing synchronous with a given or perdetermined one of delayed clock pulses described below, a numeral 2 denotes a clock pulse generator for generating a clock pulse signal including a train of individual pulses and having a pulse repetition frequency, for example, of 30 MHz, and a numeral 11 denotes a clock pulse delay circuit which may be constituted by a programmable delay generator (such as commercially available from Analogue Devices Incorporation under a trade name of "IC AD9501") and which serves to delay the above-mentioned clock pulses generated by the clock pulse generator 2 for a predetermined delay time (e.g., an amount given by $(N-1) \times 20.8$ ns where N is an integer representing the number of times the light pulse is to be emitted for a signal distance measurement and may assume a numerical value in the range of 2 to 16), wherein the given one of the delayed clock pulses is then supplied to the pulsed laser 1, as described above. Further, a reference numeral 3 denotes a photo-detection circuit incorporating a photo-electric converting function and an amplifying function, a numeral 4 denotes a flash type analogue-to-digital (A/D) converter capable of operating at a high speed to convert the output signal from the photo-detection circuit 3 into a corresponding digital signal or data in synchronism with the aforementioned clock pulse signal, a numeral 5 denotes a memory for storing the digital data resulting from the A/D conversion, and a numeral 6 denotes an address generator for generating an A/D conversion timing signal to the A/D converter 4 in synchronism with the above-mentioned clock pulse signal, determining a least significant address of a memory area in the memory 5 for storing the result of the A/D conversion performed by the A/D converter 4 by counting the clock pulses mentioned above and determining the number of samplings for the A/D conversion which are to be effected for a single lasing (i.e. light emission) of the pulsed laser 1. A reference numeral 7 denotes a processing unit designed to serve for triggering the light pulse emission of the pulsed laser 1, designation of a most significant address of the above-mentioned memory area in the memory 5, determination of the amount of the delay to be set at the clock pulse delay circuit 11 and arithmetic determination of the distance on the basis of a waveform of the echo pulse signal which is obtained through synthesization of the data stored in the memory 5, as will hereinafter be described. Finally, a reference numeral 10 denotes an object to which distance is to be measured. In the case of the illustrated embodiment, the amount of delay set at the clock pulse delay circuit 11 by the processing unit 7 is selected to be one-sixteenth of a period of the clock pulse signal having a frequency of 30 MHz, i.e. the delay of about 20.8 ns.

Figure 2:
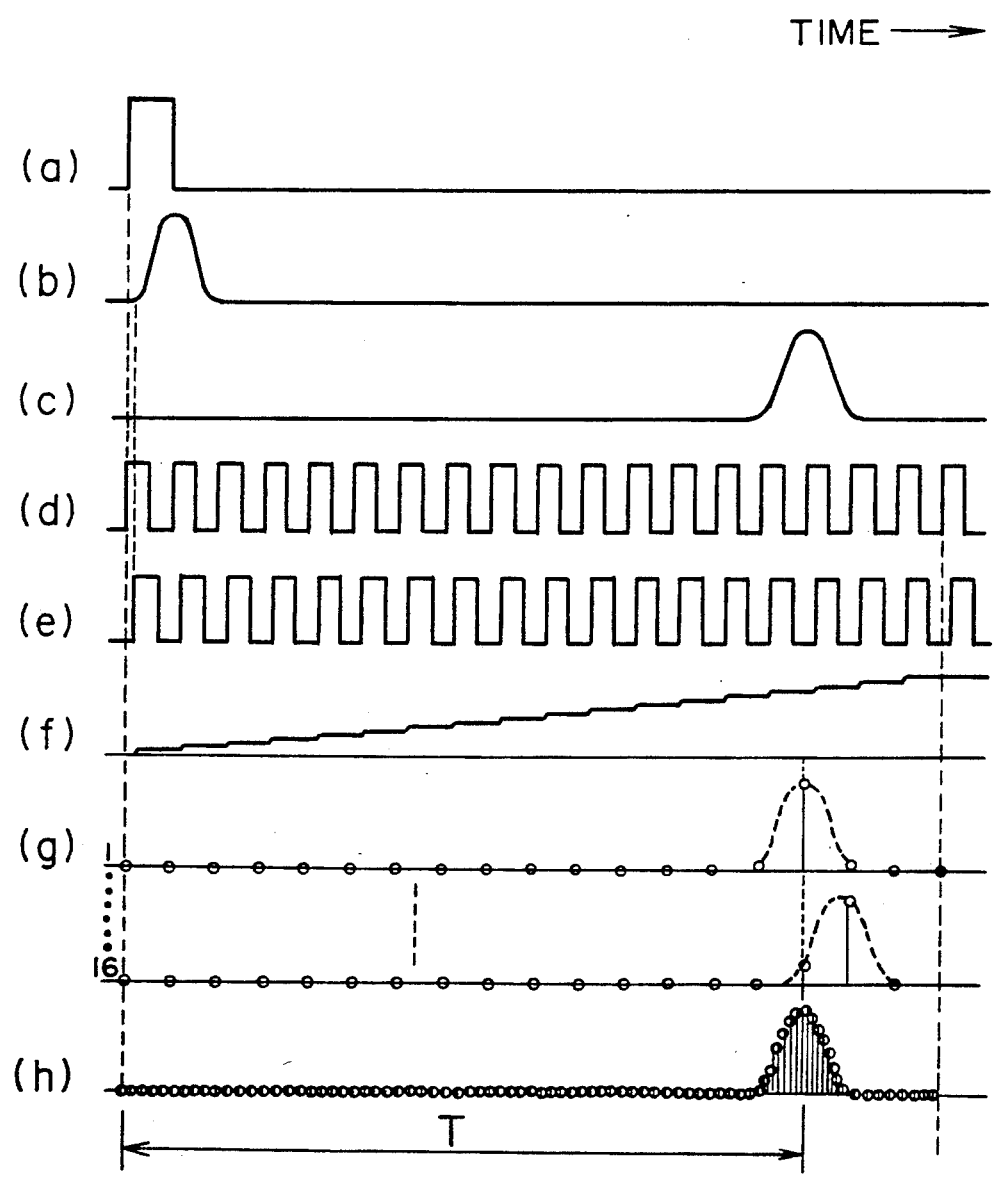
FIG. 2 is a waveform diagram for illustrating the operation of the apparatus shown in FIG. 1.

FIG. 2 is a timing chart for illustrating the operation of the distance measuring apparatus of the structure described above.

Next, description will be directed to the operation of the distance measuring apparatus according to the first embodiment of the invention by reference to FIG. 12 in combination with FIG. 1.

At first, the processing unit 7 places "0" (zero) at the most significant address of the memory 5 to thereby set "0" (zero) at the clock pulse delay circuit 11 so that the latter generates a delay time of 0 ns. Thus, the clock pulse delay circuit 11 delays the clock pulse (FIG. 2, (d)) output by the clock pulse generator 2 by the set amount. The delayed clock pulses (FIG. 2, (e)) are then output to the pulsed laser 1. At the same time, the processing unit 7 triggers the lasing of the pulsed laser 1, as illustrated in FIG. 2 at (a). In response to the trigger signal, the pulsed laser 1 emits a light pulse in synchronism with the first or leading one of the delayed clock pulse train (FIG. 2, (e)), as shown in FIG. 2 at (b).

The address generator 6 also responds to the trigger signal input from the processing unit 7 to begin counting of the clock pulses supplied from the clock pulse generator 2, starting from the count of zero. The counting operation of the address generator 6 is stopped at the time point when the count value representing a time lapse corresponding to a predetermined range of distance for measurement has been attained. Refer to FIG. 2 at (f). The light pulse (b) emanated from the pulsed laser 1 is reflected by the object 10 of concern. The echo light pulse resulting from this reflection is then received by the photo-detection circuit 3 which then outputs a corresponding electric signal (FIG. 2 (c)) after amplification. The output signal (c) of the photo-detection circuit 3 then undergoes the analogue-to-digita (A/D) conversion by the A/D converter 4 in synchronism with every rise-up edge of the clock pulse generated by the clock pulse generator 2 under the timing of the A/D conversion sampling signal applied from the address generator 6, as is shown in FIG. 2 at (g), in which numerals 1 to 16 designate orderly the number of times the light pulse is generated, while circles represent values resulting from the sampling in the A/D conversion. The result of the A/D conversion is stored in synchronism with the falling edge of the clock pulse in the memory 5 at the area having the most significant address determined previously by the processing unit 7 and the least significant address determined by the count value of the address generator 6. The A/D conversion is repeated until the counting operation of the address generator 6 is stopped.

Upon completion of the operation of storing the results of the A/D conversion mentioned above for the first light pulse emission, the processing unit 7 increments the most significant address of the above-mentioned memory area for thereby setting an updated most significant address of a memory area for storing data which will be obtained from a succeeding lasing and A/D conversion. Further, the processing unit 7 increments the amount of delay to be set at the clock pulse delay circuit 11 to 20.8 ns and triggers again the lasing of the pulsed laser 1, whereon execution of the processing similar to what has been described above for the first lasing is repeated.

When the number of times the light pulse was emitted (i.e. the number of the lasings) has attained a predetermined number, for example, 16 (sixteen) with the data resulting from the A/D conversions performed for the sixteen echo light pulses having been stored in the respective memory areas, the processing unit 7 reads out sequentially these data from the relevant areas of the memory 5 to rearrange them in the time-serial order of the light pulse emissions or lasings, whereon 16 echo light pulse waveform data obtained obtained through the A/D conversions for the sixteen echo light pulse signals are synthesized into one waveform. To this end, the digital data resulting from the A/D conversion performed for the first light pulse emission may be interpolated with the data obtained at the corresponding time points in the 2nd to 16-th light pulse emission cycles, respectively. Thus, there can be obtained a synthesized waveform equivalent to a waveform which can be obtained from the A/D conversion performed at sixteen times as high sampling or clock pulse frequency (i.e. equivalent frequency of 480 MHz in the case of the illustrated embodiment), as will be understood from the waveform illustrated in FIG. 2 at ($h$).

A maximum value of the synthesized echo light pulse waveform ($h$) is then determined as the peak of the echo light pulse. Subsequently, on the basis of the number of the clock pulses which have been generated before the peak makes appearance in the synthesized waveform (and which can be determined from the value of the least significant address at the time point the peak takes place), the time (corresponding to T in FIG. 2) intervening between the light pulse emission of the pulsed laser 1 and the reception of the echo pulse signal is determined to be translated into a distance S to the object in accordance with the following equation (2):

$$S = \{(n \times C)/(f \times N)\}/2 \quad (2)$$

where n represents the number of the clock pulses generated before the peak makes appearance in the synthesized waveform, as counted from a time point the first light pulse is emitted;
C represents the velocity of light;
f represents the frequency of the clock pulse signal generated by the clock generator 2; and
N represents the number of times the light pulse is emitted for a single distance measurement.

Assuming, for example, in the illustrated embodiment that the peak makes appearance at the 200-th clock pulse as counted from the emission of the first light pulse, the distance S ot the object 10 can be determined as follows:

$$62.5 \text{ m} = \{(200 \times 3 \times 10^8)/(30 \times 16 \times 10^6)\}/2$$

Next, a second embodiment of the distance measuring apparatus according to the present invention will be described by reference to FIGS. 3 and 4.

Figure 3:
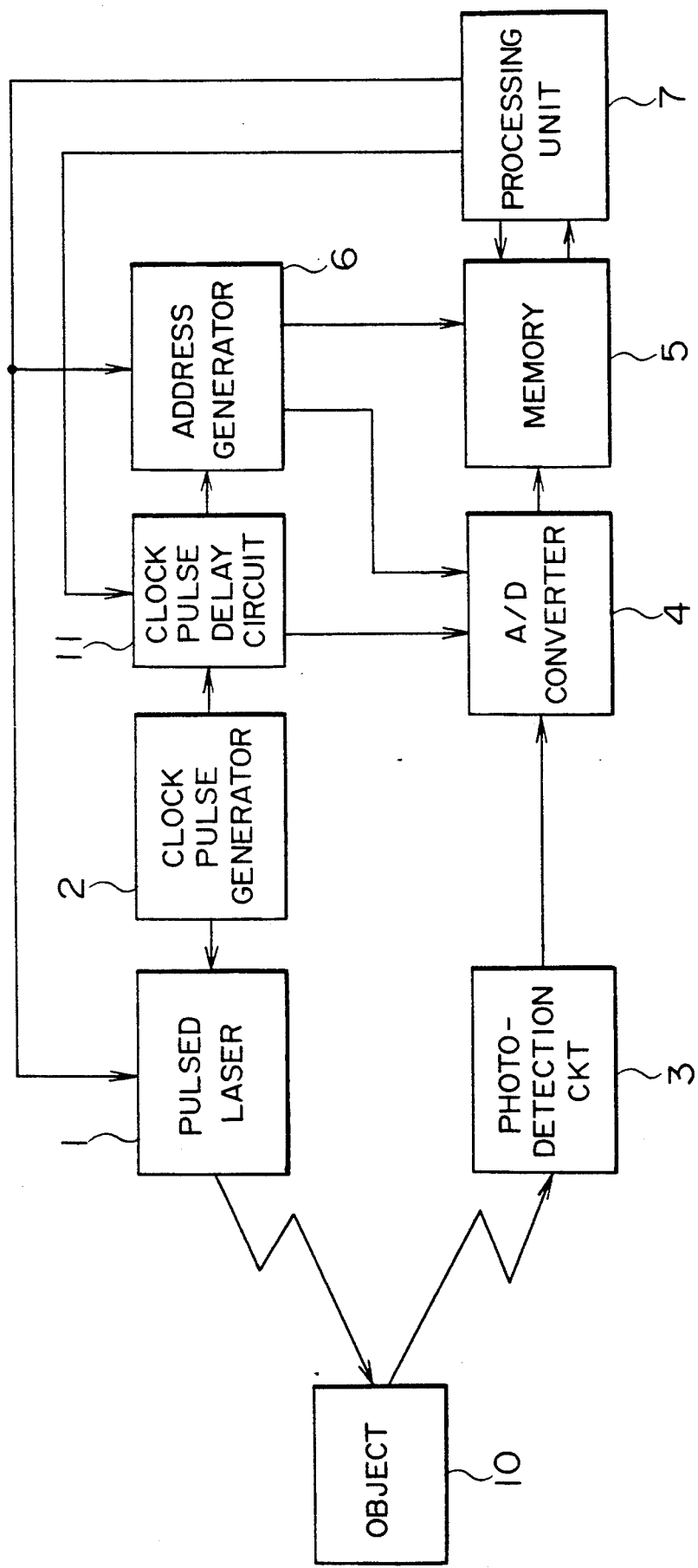
FIG. 3 is a block diagram showing the general arrangement of a distance measuring apparatus according to a second embodiment of the present invention.

As will be understood from the comparison of FIG. 1 with FIG. 3, the structure as well as components of the distance measuring apparatus according to the second embodiment is substantially the same as the first embodiment described above except that the clock pulse delay circuit 11 is so connected as to delay the timing for sampling the output of the photo-detection circuit 3 instead of delaying the light pulse emission of the pulsed laser 1. Accordingly, in FIG. 3, same reference numerals are used to denote like elements as those shown in FIG. 1, and description will be omitted concerning the structure of the distance measuring apparatus according to the second embodiment.

In the following, operation of the second embodiment will be described by reference to FIG. 4 which is a timing chart for illustrating the the operation of the distance measuring apparatus according to the second embodiment.

The processing unit 7 places "0" (zero) at the most significant address of the memory 5 to thereby set "0" (zero) at the clock pulse delay circuit 11 so that the latter generates a delay time of 0 ns. Thus, the clock pulse delay circuit 11 delays the clock pulse (FIG. 4, ($d$)) output by the clock pulse generator 2 by the set amount. On the other hand, the processing unit 7 triggers the lasing of the pulsed laser 1, as illustrated in FIG. 4 at ($a$). In response to the trigger signal, the pulsed laser 1 emits a light pulse in synchronism with the first to leading one of the clock pulse train (FIG. 4, ($d$) generated by the clock pulse generator 2, as is illustrated in FIG. 4 at ($b$).

Figure 4:
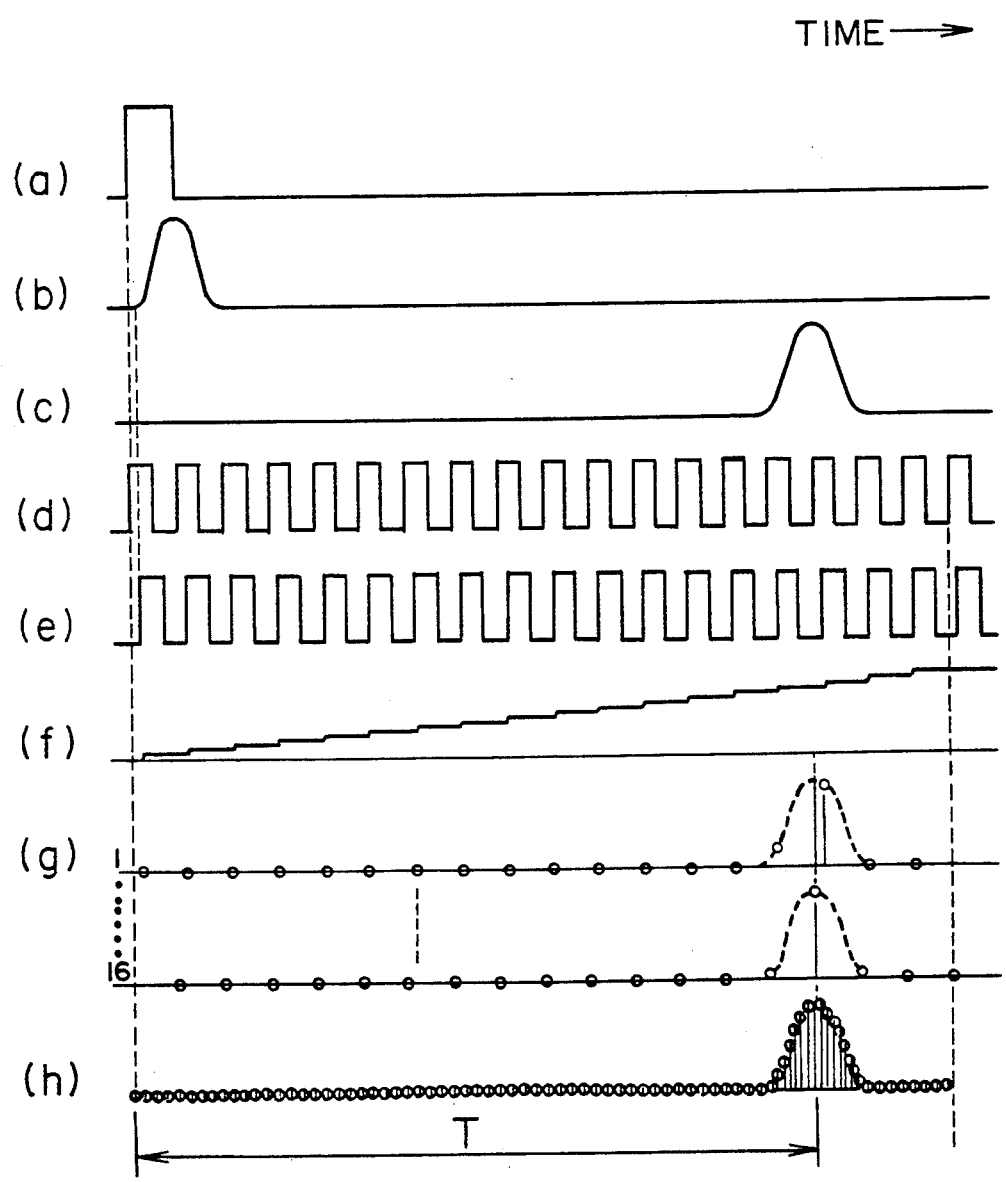
FIG. 4 is a waveform diagram illustrating the operation of the apparatus shown in FIG. 3.

The address generator 6 also responds to the trigger signal input from the processing unit 7 to start to count the delayed clock pulses (FIG. 4, ($e$)) supplied from the clock pulse delay circuit 11, starting from the count of zero. The counting operation of the address generator 6 is stopped at the time point when the count value representing a time lapse corresponding to a predetermined range of distance for measurement has been attained. Refer to FIG. 4 at ($f$). The light pulse ($b$) emanated from the pulsed laser 1 is reflected by the object 10 of concern. The echo light pulse resulting from the reflection is then received by the photo-detection circuit 3 which then outputs a corresponding electric signal (FIG. 4, ($c$)) after amplification. The output signal ($c$) of the photo-detection circuit 3 then undergoes the analogue-to-digital (A/D) conversion by the A/D converter 4 in synchronism with every rising edge of the delayed clock pulse generated by the clock pulse delay circuit 11 under the timing of the A/D conversion sampling signal supplied from the address generator 6, as is shown in FIG. 4 at ($g$). The result of the A/D conversion is stored in synchronism with the falling edge of the clock pulse in the memory 5 at an area having the most significant address determined previously by the processing unit 7 and the least significant address determined by the count value of the address generator 6. The A/D conversion is repeated until the counting operation of the address generator 6 is stopped.

Upon completion of the operation of storing the result of the A/D conversion mentioned above for the first light pulse emission, the processing unit 7 increments the most significant address of the above-mentioned memory area for thereby setting an updated most significant address of a memory area for storing data obtained from a succeeding lasing and A/D conversion. Further, the processing unit 7 increments the amount of delay to be set at the clock pulse delay circuit 11 by 20.8 ns and triggers again the lasing of the pulsed laser 1, whereon execution of the processing similar to what has been described above for the first lasing is repeated.

When the number of times the light pulse is emitted has attained 16 (sixteen) with the data resulting from the A/D conversions for the sixteen echo light pulses having been stored, the processing unit 7 reads out sequentially these data from the relevant areas of the memory 5 to rearrange them in the time-serial order of the light pulse emissions, whereon 16 echo light pulse sample waveforms represented by the results of the A/D conversions for the sixteen echo light pulses are synthesized into one waveform. To this end, data resulting from the A/D conversion performed for the first light pulse emission may be interpolated with the data obtained at the corresponding time points in the 2nd to 16-th light pulse emissions, respectively. Thus, there can be obtained a synthesized waveform equivalent to a waveform which can be obtained from the A/D conversion performed at sixteen times as high as the sampling or clock pulse frequency (480 MHz), as will be understood from a synthesized waveform illustrated in FIG. 4 at (h).

A maximum value of the synthesized echo light pulse waveform is then determined as the peak of the echo light pulse. Subsequently, on the basis of the location of the peak in the synthesized waveform, i.e. the number of clock pulses generated before the peak makes appearance (which can straight-forwardly be determined from the value of the least significant address of the memory 5 at the time point the peak takes place), the time (corresponding to T in FIG. 4) intervening between the light pulse emission of the pulsed laser 1 and the reception of the echo light pulse is determined to be translated into a distance to the object in accordance with the equation (2) described hereinbefore in conjunction with the first embodiment.

As will now be understood from the foregoing description, it is possible according to the teachings of the invention incarnated in the embodiments illustrated above to sample the received echo light pulse signal at a sampling frequency which is equivalently 16 times as high as the upper limit frequency of 30 MHz to which the conventional digital IC can respond. As a result, resolution of the distance measurement can be increased up to 16 times as high as the resolution realized with the sampling at the frequency of 30 MHz (i.e. the resolution of 5 m can be increased to 0.3125 m, one-sixteenth of 5 m). It goes without saying that the resolution can further be enhanced by increasing the equivalent sampling frequency, which can be realized by setting shorter the unit delay time.

Further, according to the teachings of the invention that the position of the peak in the waveform synthesized from the data obtained through A/D conversions for a number of the echo pulse signals is identified as representing the position of the object 10, the problem of the known range-finding apparatus that error is involved due to the processing by using the threshold level, as discussed hereinbefore, can satisfactorily be solved, whereby the distance measurement can be accomplished with high accuracy. Additionally, the linearity of the distance measurement can significantly be improved as well.

Figure 5:
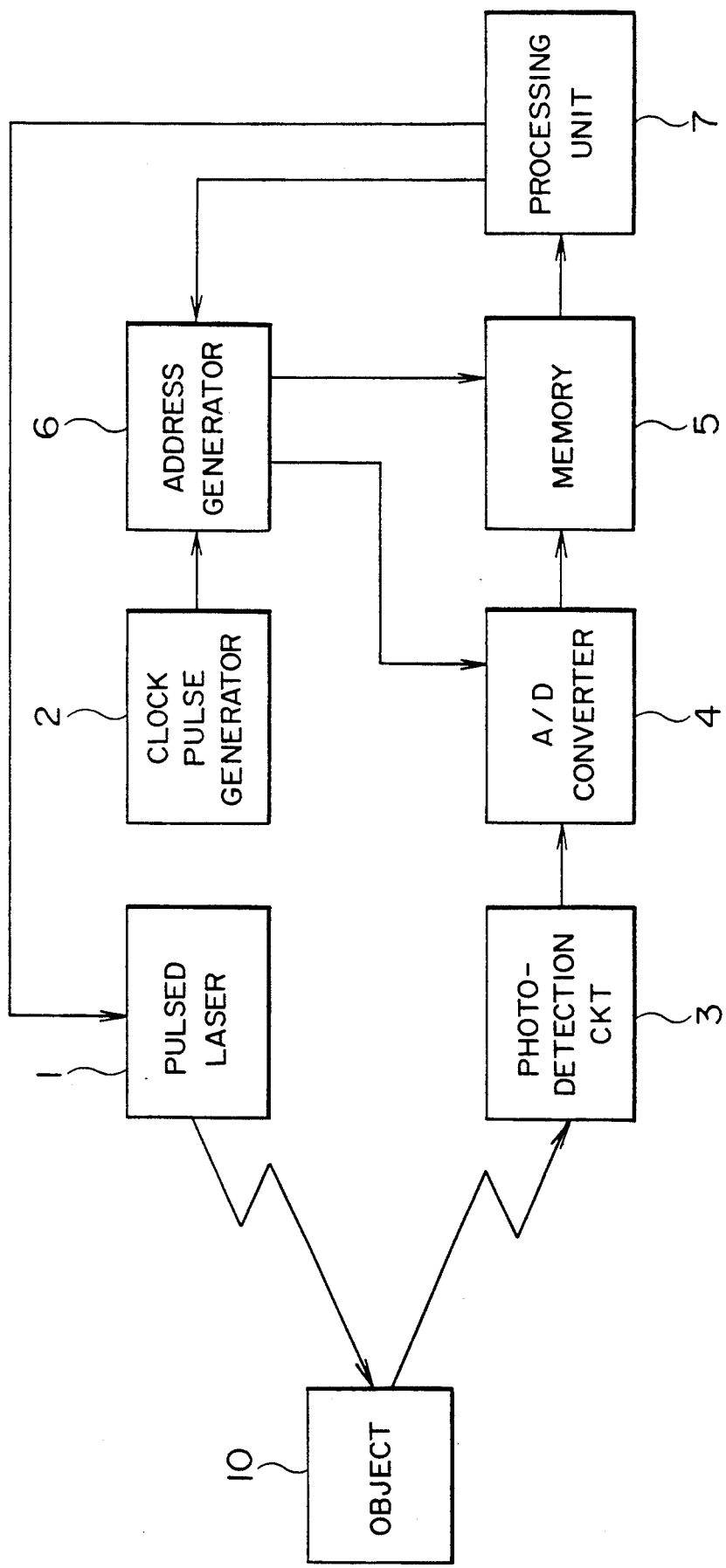
FIG. 5 is a block diagram showing the general arrangement of a distance measuring apparatus according to a third embodiment of the present invention.
Figure 6:
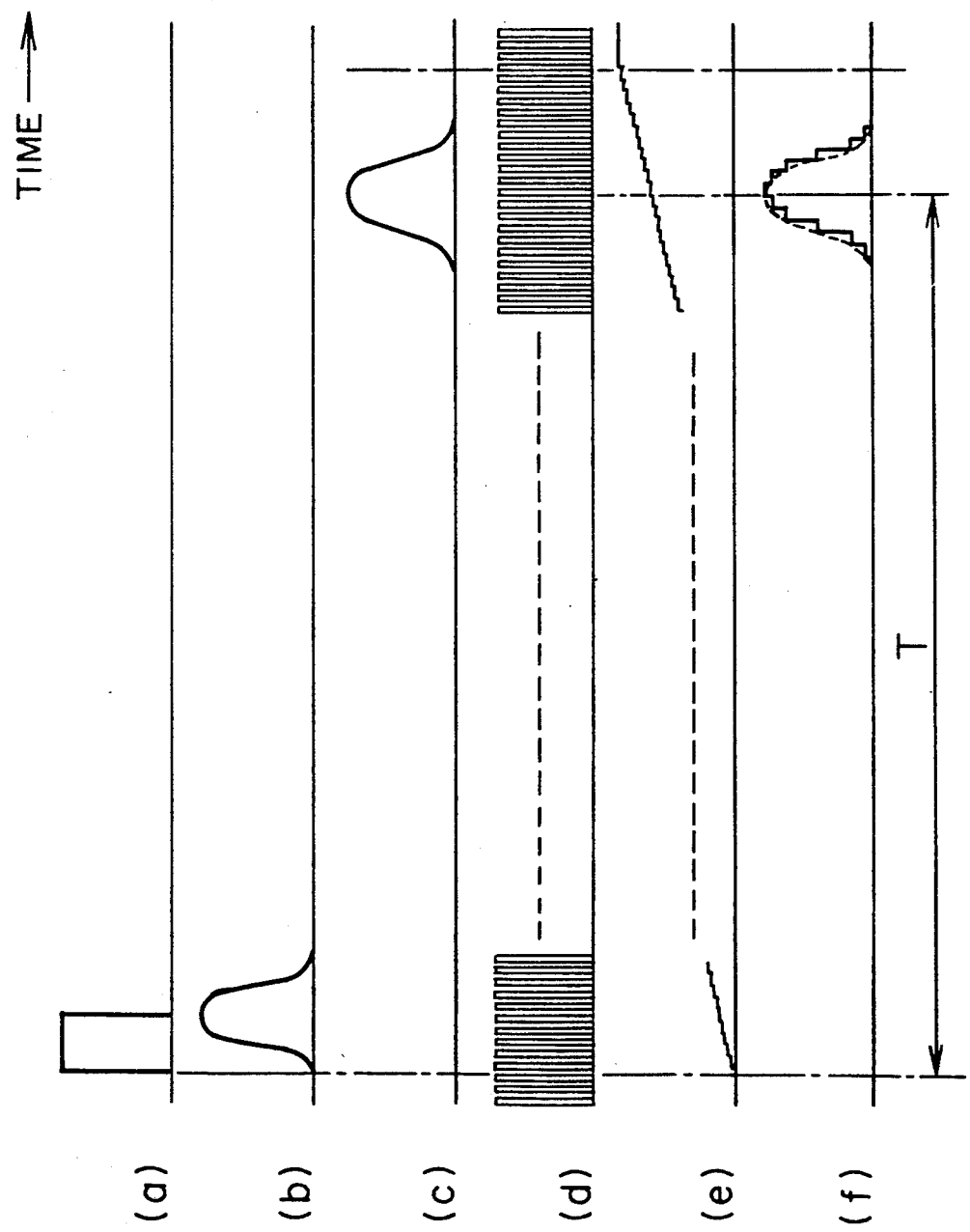
FIG. 6 is a waveform diagram illustrating the operation of the apparatus shown in FIG. 5.

Now, description will be directed to a third embodiment of the distance measuring apparatus according to the invention by reference to FIGS. 5 and 6. With the instant embodiment, it is intended to implement the distance measuring apparatus by omitting the clock pulse delay circuit employed in the first and second embodiments while ensuring the advantageous effects of the latter.

FIG. 5 is a block diagram showing the general arrangement of the distance measuring apparatus according to a third embodiment of the invention. In FIG. 5, a reference numeral 1 denotes a pulsed laser, 2 denotes a clock pulse generator for generating clock pulses at a pulse repetition frequency of 300 MHz, by way of example, 3 denotes a photo-detection circuit, 4 denotes a flash type analogue-to-digital (A/D) converter capable of A/D conversion at a high speed to convert the output signal from the photo-detection circuit 3 into a corresponding digital data signal, 5 denotes an ECL-type memory having a very short access time, and a numeral 6 denotes an address generator for generating an A/D conversion timing signal to the A/D converter 4 in synchronism with the clock pulses output from the clock pulse generator 2, determining addresses of the memory 5 for storing, respectively, the results of the A/D conversion performed by the A/D converter 4 by counting the clock pulses mentioned above and determining the number of times the A/D conversion is to be effected for a single light pulse emission of the pulsed laser 1. A reference numeral 7 denotes a processing unit operation of which will hereinafter be described, and a numeral 10 denotes an object to which distance is to be measured.

FIG. 6 is a timing chart for illustrating the operation of the distance measuring apparatus according to the third embodiment of the invention.

Next, description will be made on operation of the instant embodiment by reference to FIG. 6 along with FIG. 5.

The processing unit 7 triggers the lasing of the pulsed laser 1, as shown in FIG. 6 at (a). In response to the trigger signal, the pulsed laser 1 emits a light pulse, as shown in FIG. 6 at (b). Further, the address generator 6 also responds to the trigger signal supplied from the processing unit 7 to start to count the clock pulses (FIG. 6, (d)) supplied from the clock pulse generator 2, starting from the count of zero, as shown in FIG. 6 at (e). The counting operation of the address generator 6 is stopped at the time point when the count value representing a time lapse corresponding to a preset range of distance for measurement has been attained. The light pulse emitted from the pulsed laser 1 is reflected from the object 10 of concern. The echo pulse resulting from the reflection is received by the photo-detection circuit 3, which then outputs a corresponding electric signal after amplification, as shown in FIG. 6 at (c). The output signal of the photo-detection circuit 3 subsequently undergoes the analogue-to-digital (A/D) conversion by the A/D converter 4 under the sampling timing synchronous with the rising edges of the clock pulses, as shown in FIG. 6 at (f). The results of the A/D conversion are stored in the memory 5 in synchronism with the falling edges of the clock pulses in the memory 5 at the addresses corresponding to every count value of the address generator 6. The A/D conversion is repeated until the counting operation of the address generator 6 is stopped.

Upon completion of the operation including the A/D conversion to the storage of the results of the A/D conversion in the memory 5 for the light pulse emission, the processing unit 7 reads out sequentially the stored data values from the memory 5 and identifies the maximum one of the values read out as representing the peak of the echo light pulse, whereon the time lapse T (FIG. 6) taken until the appearance of the peak of the echo light pulse from the light pulse emission is determined on the basis of the data value of the address at which the peak is identified. On the basis of the time thus determined (corresponding to the time T shown in FIG. 6, the distance to the object of concern can be determined. Namely, the distance S can be determined in accordance with the following equation:

$$S = \{(n/f) \times C\}/2 \quad (3)$$

where n represents the number of the clock pulses generated before the peak makes appearance in the data stored in the memory, as counted from a time point the pulsed laser is triggered;

C represents the velocity of light; and f represents the frequency of the clock pulse signal generated by the clock generator 2.

Assuming, for example, in the illustrated embodiment that the peak makes appearance at the 200-th clock pulse as counted from the triggering of the pulsed laser, the distance S to the object 10 can be determined as follows:

$$100\ m = \{200/(30 \times 10^6)\} \times (3 \times 10^8)/2$$

As will be appreciated from the above description, in the case of the third embodiment of the invention, although the clock pulse generator capable of generating the clock pulse signal at a higher frequency than that of the corresponding pulse generators used in the first and second embodiments is required, the clock pulse delay circuit can be omitted. Further, the signal representing the echo light pulse is not directly compared with a predetermined threshold value as with the case of the known distance measuring apparatus, but the digital data derived from the output of the photo-detection circuit 3 through the A/D conversion are once stored in the memory 5 to be subsequently subjected to the analytical processing by the processing unit 7 to find out the maximum or peak value. By virtue of this feature, erroneous detection due to noise components resulting from scattering of the emitted light pulses at other objects than the aimed one can be positively prevented. In this conjunction, it is noted that the pulse width of the detected echo light pulse is considerably broader than that of shot noise component which is predominant in the output of the photo-detection circuit. Accordingly, it is very easy to remove the signal components having short durations discriminatively from the signal waveform of the echo light pulse recorded in the memory 5 through arithmetic processing. This means that only the signal component representing the valid echo light pulse can be extracted. At this juncture, it should also be added that the processing unit 7 may include an appropriate digital filter circuit for suppressing the noise components. In this way, the erroneous detection of the echo signal which the known range-finding apparatus suffers can satisfactorily be suppressed. Besides, since the location of the peak of the echo light pulse signal is regarded straight-forwardly as the position of the object of concern, errors brought about due to comparison with the threshold level can be evaded according to the invention, whereby not only the distance measurement can be accomplished with high accuracy and but also it can enjoy an improved linearity.

Figure 7:
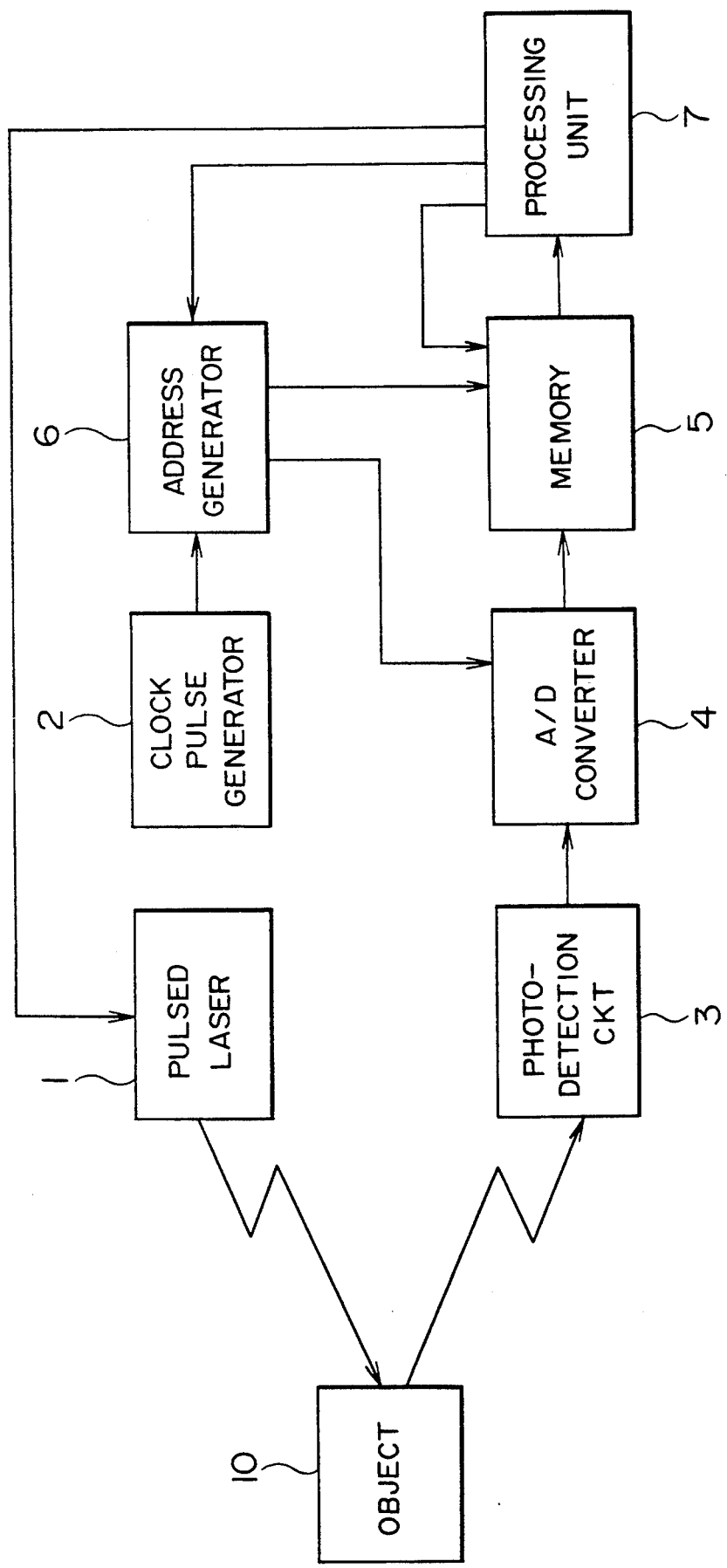
FIG. 7 is a block diagram showing the general arrangement of a distance measuring apparatus according to a fourth embodiment of the present invention.
Figure 8:
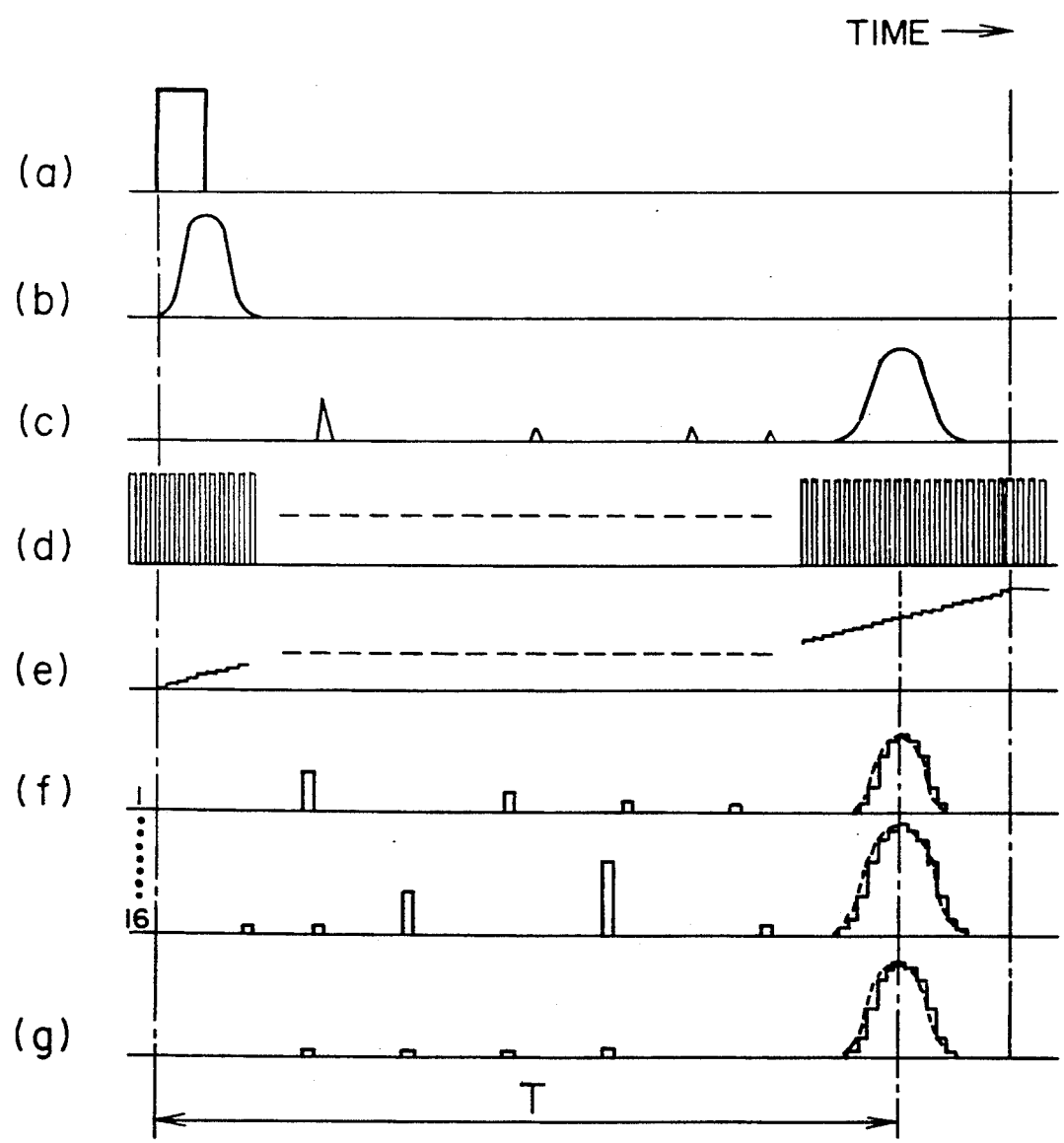
FIG. 8 is a waveform diagram illustrating the operation of the apparatus shown in FIG. 7.
Figure 9:
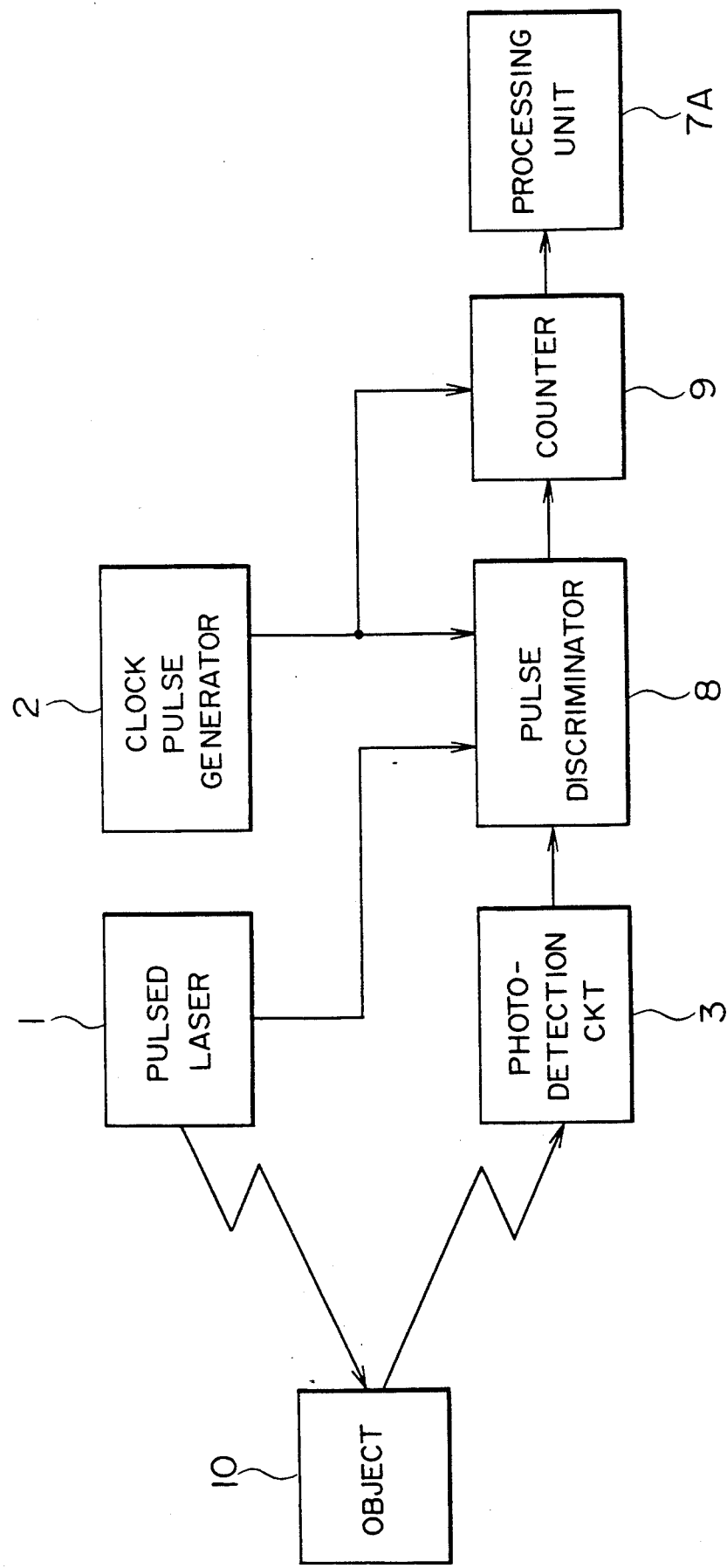
FIG. 9 is a block diagram showing the structure of a known distance measuring apparatus.
Figure 10:
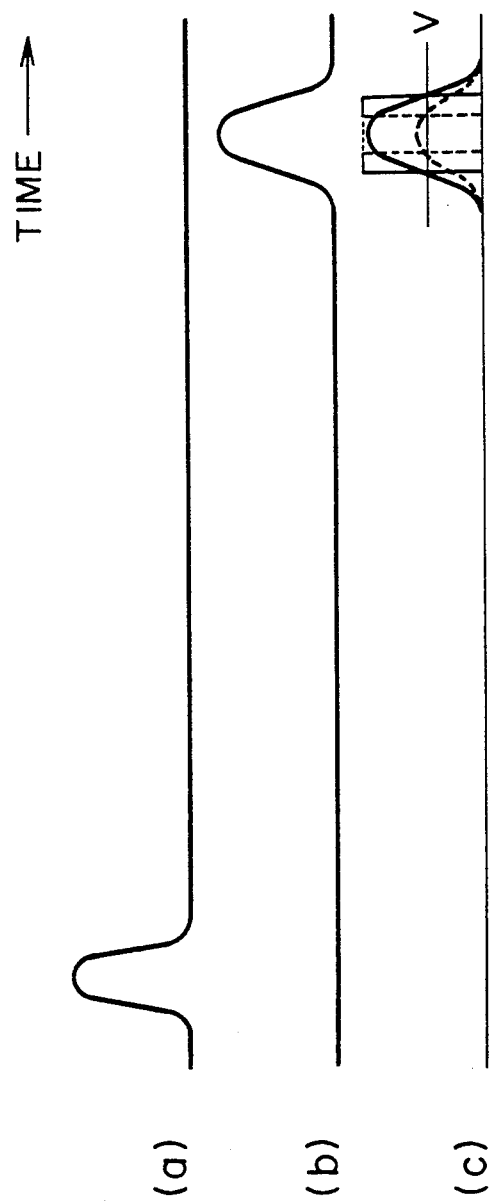
FIG. 10 is a waveform diagram illustrating the operation of the apparatus shown in FIG. 9.

Next, a fourth embodiment of the distance measuring apparatus according to the present invention will be described by reference to FIGS. 7 and 8, wherein FIG. 7 is a block diagram showing the arrangement of the apparatus and FIG. 8 is a waveform diagram for illustrating the operation of the same. The fourth embodiment differs from the third embodiment in that data obtained from the A/D conversion and stored in the memory 5 are averaged, and the distance is determined on the basis of the result of the averaging operation.

In FIG. 7, a reference numeral 1 denotes a pulsed laser for emitting a light pulse, 2 denotes a clock pulse generator for generating a clock pulse signal having a frequency of 300 MHz, by way of example, 3 denotes a photo-detection circuit having a photo-electric converting function and an amplifying function, 4 denotes a flash type analogue-to-digital (A/D) converter capable of operating at a high speed to convert the output signal from the photo-detection circuit 3 into a corresponding digital data signal, a numeral 5 denotes an ECL-type memory having a very short access time for storing the digital data resulting from the A/D conversion, a numeral 6 denotes an address generator for generating an A/D conversion timing signal to the A/D converter 4 in synchronism with the clock pulse signal output from the pulse generator 2, determining a least significant address of the memory 5 for storing the results of the A/D conversion performed by the A/D converter 4 by counting the clock pulses and determining the number of times the A/D conversion is to be effected, a numeral 7 denotes a processing unit designed to serve for triggering the light pulse emission of the pulsed laser 1, determining a most significant address of the memory 5 and arithmetically the distance based on the data stored in the memory 5.

Next, description will be made on the operation of the distance measuring apparatus according to the fourth embodiment of the invention by reference to FIG. 8 in combination with FIG. 7.

The processing unit 7 sets "0" (zero) at the most significant address of the memory 5 and then triggers the lasing of the pulsed laser 1, as shown in 8 at (a). In response to the trigger signal, the pulsed laser 1 emits a light pulse as shown in FIG. 8 at (b). Further, the address generator 6 also responds to the trigger signal to start to count of the clock pulses (FIG. 8, (d)) from the clock pulse generator 2, starting from the count of zero, as is illustrated in FIG. 8 a (e). The counting operation of the address generator 6 is stopped at the time point when the count value corresponding to a time span representing a predetermined distance range has been attained. The light pulse emanated from the pulsed laser 1 is reflected by the object 10 of concern. The echo light pulse resulting from the reflection is then received by the photo-detection circuit 3 which outputs a corresponding electric signal after amplification, as is shown in FIG. 8 at (c). The output signal of the photo-detection circuit 3 then undergoes the analogue-to-digital (A/D) conversion by the A/D converter 4 under the timing which is in synchronism with the rising edges of the clock pulses generated by the clock pulse generator 4, as is illustrated in FIG. 8 at (f), wherein numerals 1 to 16 represents the number of times the light pulse is emitted. The data resulting from the A/D conversion are stored in synchronism with the falling edges of the clock pulses in the memory 5 at a memory area of which the most significant address has previously been determined by the processing unit 7 with the least significant address being determined by the count value of the address generator 6. The A/D conversion is repeated until the counting operation of the address generator 6 is stopped. Upon completion of the operation of storing the data obtained from the A/D conversion mentioned above for the first light pulse emission, the processing unti 74 increments the most significant address of the memory 5 for thereby updating the address for storing the result of the succeeding A/D conversion, whereon the process similar to what has been described above is repetitively executed.

When the number of times the light pulse is emitted (i.e. the number of the lasing) has attained 16 with the results of the A/D conversions for the sixteen echo light pulses having been stored in the memory areas, the processing unit 7 reads out sequentially these results of the A/D conversions from the memory 5, whereon 16 echo light pulse sample data are subjected to an averaging processing, as illustrated in FIG. 8 at (g). In the averaging processing, the data resulting from the A/D conversions for the sixteen echo light pulse signals and stored at respective memory areas are added together, and the sum is divided by sixteen, whereby an averaged waveform of the sixteen light pulse waveforms can be obtained. Subsequently, a maximum level or amplitude of th averaged echo light pulse waveform (FIG. 8, (g)) is detected as representing the peak of the echo light pulse signal reflected back from the object 10. By determining the time T intervening between the light pulse emission from the pulsed laser 1 and the appearance of the peak in the averaged waveform on the basis of the number of the clock pulses generated until the appearance of the peak, it is possible to arithmetically determine the distance to the object 10 in accordance with the equation (3) mentioned hereinbefore in conjunction with the third embodiment of the invention.

Now, let's consider S/N ratio of the echo light pulse signal. Usually, the output signal from the photo-detection circuit 3 is accompanied with shot noise, thermal noise and other spurious components. When the signal energy of the echo undergone the A/D conversion is represented by $E_S$ with that of white noise resulting from band limitation of the above-mentioned noise components being represented by $E_N$, the S/N ratio after the A/D conversion is given by $E_S/E_N$. Through the averaging processing described above, energy level $E_S$ of white noise is decreased to 1/16 because occurrence of noise is at random although the signal energy $E_S$ of the echo remains substantially the same after the averaging processing. This means that the S/N ratio is improved by a factor of 16 (12 dB) because the following formula is etablished:

$$S/N = E_S/(E_N/16) = 16 \times E_S/E_N$$

More specifically, by averaging 16 sampled waveforms each superposed with nose components (FIG. 8, (f)), the noise components can be suppressed, as can be seen at (g) in FIG. 8, whereby only the valid echo light pulse signal component is extracted. In this conjunction, it should further be mentioned that a PIN photodiode is employed as a photoelectric conversion element in the photo-detection circuit 3, the output signal of which is approximately in proportion to a quotient obtained by dividing the output power of the pulsed laser 1 by a square of the distance to the object 10. Accordingly, the signal energy of the echo light pulse signal resulting from the A/D conversion is approximately in inverse proportion to the fourth power of the distance. Accordingly, improvement of the S/N ratio by a factor of 16 attained by the averaging operation means that the distance which can be detected or measured is increased by 2 (= subquadruple of 16) in the case of the illustrated embodiment.

As will be appreciated from the foregoing, the S/N ratio can significantly be improved through the averaging processing of the echo light pulse signals, whereby error involved in the distance measurement due to noise can be suppressed to a minimum. Thus, the distance detection capability of the range-finding apparatus can remarkably be enhanced. On the other hand, assuming that the distance range aimed for detection is the same as that of the known apparatus, the signal energy of the echo light pulse may be one-sixteenth of that of the known apparatus. Consequently, a pulsed laser of a low power can satisfactorily be used, whereby the distance measuring apparatus can be realized correspondingly inexpensively to an economical benefit.

Besides, since the location of the peak of the echo light pulse signal is regarded as representing the location or position of the object of concern, errors produced in the known apparatus due to comparison with the threshold level can also be essentially evaded, whereby not only the distance measurement can be accomplished with high accuracy and but also it can enjoy an improved linearity.

In practical application of the embodiments of the invention described above, a time lag may intervene more or less between the trigger of the pulsed laser and appearance of the peak in the echo signal waveform data. Accordingly, the distance determined with reference to the laser trigger timing will be measured a little longer than the actual distance. However, by experimentally determining the time lag mentioned above beforehand and subtracting a distance corresponding to the lag from the arithmetically determined distance, there can be realized an accurate distance measurement.

In the foregoing description, it has been assumed that the light pulse generator is constituted by the pulsed laser. It should however be appreciated that other light source such as LED (light emitting diode) or the like may equally be employed. Further, since the distance measuring apparatus according to the invention can operate by making use of an electromagnetic wave in principle, the light pulse generator and the photo-detection circuit may be replaced by an electromagnetic wave pulse generator and an electromagnetic pulse detection circuit to similar effects.

It is thought that the present invention and many of its attendant advantages will be understood from the foregoing description and it will be apparent that various changes may be made in the form, construction and arrangement thereof without departing from the spirit and scope of the invention or without sacrificing all of its material advantages, the form hereinbefore described being merely a preferred or exemplary embodiment thereof.

What is claimed is:

1. A distance measuring apparatus for measuring a distance to an object of concern, comprising:
   clock pulse generating means for generating a clock pulse signal at predetermined frequency;
   clock pulse delay means for delaying said clock pulse signal by an amount corresponding to an integral multiple of a time duration resulting from division of a period of said clock pulse signal by an integer (N) which is greater than 2 (two) to thereby generate a delayed clock pulse signal;

light pulse generating means for generating a light pulse at a timing synchronous with a given one of the pulses of said delayed clock pulse signal;

photo-detection means for receiving an echo light pulse resulting from reflection of said light pulse at said object and converting said echo light pulse into an electric signal;

analogue-to-digital conversion means for converting the electric signal output from said photo-detection means to digital data at a timing synchronous with the individual clock pulses of said clock pulse signal;

memory means for sequentially storing said digital data output from said analogue-to-digital conversion means; and processing means for imparting different delays to said clock pulse signal so that said delayed clock pulse signal is delayed by different amounts for N emissions to said light pulses, respectively, and synthesizing N sets of digital data stored in said memory means by rearranging on a time-serial basis said N sets of digital data to thereby arithmetically determine the distance to said object on the basis of a pulse waveform obtained by said synthesization.

2. A distance measuring apparatus according to claim 1, wherein said processing means determines said distance on the basis of said synthesized waveform in accordance with the following formula:

$$S = \{(n \times C)/(f \times N)\}/2$$

where n represents the number of the clock pulses generated before a peak makes an appearance in said synthesized waveform, as counted from a time point when the first one of said light pulses is emitted;

C represents the velocity of light;

f represents the frequency of said clock pulse signal generated by said clock pulse generating means;

N presents the number of times said light pulse is emitted for a single distance measurement; and S represents said distance.

3. A distance measuring apparatus according to claim 1, wherein said light pulse generating means comprises a pulsed laser.

4. A distance measuring apparatus according to claim 1, wherein said light pulse generating means comprises a light emitting diode controlled to emit light pulses.

5. A distance measuring apparatus for measuring a distance to an object of concern, comprising:

clock pulse generating means for generating a clock pulse signal at a predetermined frequency;

clock pulse delay means for delaying said clock pulse signal by an amount corresponding to an integral multiple of a time duration resulting from division of a period of said clock pulse signal with an integer (N) which is greater than 2 (two) to thereby generate a delayed clock pulse signal;

light pulse generating means for generating a light pulse at a timing synchronous with a given one of the pulses of said clock pulse signal;

photo-detection means for receiving an echo light pulse resulting from reflection of said light pulse at said object and converting said echo light pulse into an electric signal;

analogue-to-digital conversion means for converting the electric signal output from said photo-detection means to digital data in synchronism with the individual clock pulses of said delayed clock pulse signal;

memory means for sequentially storing said digital data obtained from said analogue-to-digital conversion means; and processing means for imparting different delays to said delayed clock pulse signals generated for N light pulse emissions, respectively, and synthesizing N sets of said digital data stored in said memory means by time-serially rearranging said N sets of data to thereby arithmetically determine the distance to said object on the basis of a pulse waveform obtained by said synthesization.

6. A distance measuring apparatus according to claim 5, wherein said processing means determines said distance on the basis of said synthesized waveform in accordance with the following formula:

$$S = \{(n \times C)/(f \times N)\}/2$$

where n represents the number of the clock pulses generated before a peak makes an appearance in said synthesized waveform, as counted from a time point when the first one of said light pulses is emitted;

C represents the velocity of light;

f represents the frequency of said clock pulse signal generated by said clock pulse generating means;

N represents the number of times said light pulse is emitted for a single distance measurement; and S represents said distance.

7. A distance measuring apparatus according to claim 5, wherein said light pulse generating means comprises a pulsed laser.

8. A distance measuring apparatus according to claim 5, wherein said light pulse generating means comprises a light emitting diode controlled to emit light pulses.

9. A distance measuring apparatus for measuring a distance to an object of concern, comprising:

clock pulse generating means for generating a clock pulse signal at a predetermined frequency;

pulse generating means for generating an electromagnetic wave pulse;

detection means for detecting an echo pulse resulting from reflection of said pulse at said object;

analogue-to-digital conversion means for converting an echo signal output from said detection means to digital data in synchronism with said clock pulse signal;

memory means for sequentially storing the digital data output from said analogue-to-digital conversion means on a time-serial basis; and processing means for processing the data stored in said memory means to thereby arithmetically determine the distance to said object on the basis of said time-serial digital data.

10. A distance measuring apparatus according to claim 9, wherein said processing means determines the data having a maxiumum value as representing a peak of said echo pulse to thereby determine said distance to said object in accordance with the following formula:

$$S = \{(n/f) \times C\}/2$$

where

S represents said distance;

n represents the number of the clock pulses generated before said peak makes an appearance in the data stored in said memory;

C represents the velocity of light; and f represents the frequency of said clock pulse signal.

11. A distance measuring apparatus according to claim 9, wherein said electromagnetic wave pulse generating means comprises a pulsed laser, said detection means comprises a photoelectric detection circuit and said pulse is a light pulse.

12. A distance measuring apparatus for measuring a distance to an object of concern, comprising:

clock pulse generating means for generating a clock pulse signal at a predetermined frequency;

pulse generating means for generating an electromagnetic wave pulse;

detection means for detecting an echo pulse resulting from reflection of said electromagnetic wave pulse at said object;

analogue-to-digital conversion means for converting said echo pulse signal output from said detection means to digital data in synchronism with said clock pulse signal;

memory means for sequentially storing the digital data output from said analogue-to-digital conversion means on a time-serial basis; and processing means for averaging N sets of said data obtained from said analogue-to-digital conversion means and stored in said memory means for N pulse emissions, respectively, where N represents a given integer, and arithmetically determining the distance to said object on the basis of one set of data obtained through said averaging operation.

13. A distance measuring apparatus according to claim 12, wherein said processing means determines data in said one set of data which has a maximum value as representing a peak of said echo pulse to thereby determine said distance to said object in accordance with the following formula:

$$S = \{(n/f) \times C\}/2$$

where

S represents said distance;

n represents the number of the clock pulses generated before said peak makes an appearance in said one set of data obtained said averaging operation;

C represents the velocity of light; and f represents the frequency of said clock pulse signal.

14. A distance measuring apparatus according to claim 12, wherein said electromagnetic wave pulse generating means comprises a pulsed laser, said detection means comprises a photoelectric detection circuit and said pulse is a light pulse.

* * * * *